(12) United States Patent
King (10) Patent No.: US 6,583,189 B1
(45) Date of Patent: Jun. 24, 2003

(54) STRENGTHENED THERMOPLASTIC

(75) Inventor: Gordon King, Mesa, AZ (US)

(73) Assignee: Nien Made Enterprise Co., Ltd., Changhua (TW)

( * ) Notice: Subject to any disclaimer, the term of this patent is extended or adjusted under 35 U.S.C. 154(b) by 0 days.

(21) Appl. No.: 10/199,188

(22) Filed: Jul. 19, 2002

Related U.S. Application Data
(60) Provisional application No. 60/319,234, filed on May 7, 2002.

(51) Int. Cl.$^7$ ................................................. C08J 9/00
(52) U.S. Cl. ............................ 521/79; 521/91; 521/138; 521/139; 521/182
(58) Field of Search ..................... 521/79, 91, 138, 521/139, 182

(56) References Cited

U.S. PATENT DOCUMENTS

| | | | |
|---|---|---|---|
| 3,935,081 A | 1/1976 | Shotton ........................ 204/30 |
| 4,169,826 A | 10/1979 | Gilbert et al. | |
| 4,314,034 A | 2/1982 | Fulmer et al. ................. 521/65 |
| 4,361,613 A | 11/1982 | Bogner et al. .............. 428/119 |
| 4,430,108 A | 2/1984 | Hojaji et al. .................... 65/22 |
| 4,677,139 A | 6/1987 | Feinmann et al. | |
| 4,743,634 A | 5/1988 | Royer | |
| 4,866,110 A | 9/1989 | Lee | |
| 5,035,275 A | 7/1991 | Yamaguchi ................... 164/34 |
| 5,114,438 A | 5/1992 | Leatherman et al. | |
| 5,723,506 A | 3/1998 | Glorioso et al. | |
| 6,066,680 A | * 5/2000 | Cope | |
| 6,083,601 A | 7/2000 | Prince et al. .................. 428/71 |
| RE37,095 E | 3/2001 | Glorioso et al. | |
| 6,293,045 B1 | 9/2001 | Morgan ........................... 47/9 |

FOREIGN PATENT DOCUMENTS

| | | |
|---|---|---|
| CN | 87107336.6 | 12/1989 |
| CN | 92112890.8 | 3/1995 |
| CN | 94107163.4 | 3/1995 |
| CN | 93118557.2 | 4/1995 |
| CN | 93118558.0 | 4/1995 |
| CN | 95106184.4 | 12/1996 |
| CN | 99113097.9 | 1/2001 |
| CN | 00107879.8 | 2/2001 |
| CN | 01120198.3 | 2/2002 |

* cited by examiner

Primary Examiner—Morton Foelak
(74) Attorney, Agent, or Firm—Sheldon & Mak; Danton K. Mak (57) ABSTRACT

A thermoplastic article, and the method for making the same. The article is formed of a closed cell foam thermoplastic or substantially solid thermoplastic strengthened with diatomaceous earth having less than about two percent moisture.

49 Claims, 5 Drawing Sheets

STRENGTHENED THERMOPLASTIC

CROSS-REFERENCE TO RELATED APPLICATIONS

The present invention disclosure claims priority to and incorporates by reference for all purposes, Provisional U.S. Patent Application No. 60/319,234, filed May 7, 2002, titled "Thermoplastic With Diatomaceous Earth," and is related to U.S. patent application Ser. No. 10/189,217 entitled Strengthened Thermoplastic for Window Coverings filed by me, herewith.

BACKGROUND OF THE INVENTION

This invention relates to structurally strengthened thermoplastics.

Wood has long been a favorite building material. Wood is also commonly used in the manufacture of products such as decorative moldings and frames, and window coverings such as window shutters, and wooden blind slats. Consumers prefer wooden window blind slats and wooden window shutter louvers to plastic, because wooden slats and louvers are light in weight, relatively high in strength and do not significantly bend or sag or decompose upon prolonged exposure to sunlight. Although in great demand, wooden window blind slats and such are not affordable to many consumers. The same is true for many other wood products such as frames and moldings. The high cost of wood and its labor intensive processing hampered the more widespread use of these products. There is a long felt need to find low cost alternatives to wood, with some of the desirable properties of wood.

U.S. Pat. No. 6,083,601 (Prince), for which applicant is a co-inventor, discloses a Venetian blind slat formed of a dried wood byproduct (cellulose, or wood powders) and plastic. The slats of this patent can be difficult and expensive to prepare because cellulose requires time consuming and expensive drying.

Therefore, there is a need to find another alternative to the use of powdered wood to create a strengthened plastic.

SUMMARY OF THE INVENTION

The present invention meets that need. The invention is directed to articles containing a thermoplastic strengthened with a porous siliceous material, such as dried diatomaceous earth, and processes for making such articles. The invention is especially useful for thermoplastic window covering products, such window blind slats, and window shutter components such as shutter louvers, shutter stiles, and shutter frames.

According to the invention, the article can be made of a closed cell foam thermoplastic or a substantially solid thermoplastic (not foam) strengthened with diatomaceous earth containing no more than about 2% by weight of moisture. Thus, a dried or powdered diatomaceous earth is used to form the article.

A preferred embodiment of the invention is an article that comprises a closed cell foam of a first thermoplastic, containing between about 1% and 40% of powdered diatomaceous earth by weight. The article is formed with diatomaceous earth containing no more than about 2% by weight of moisture. Preferably the article comprises between about 1% and about 40% by weight of diatomaceous earth, more preferably between about 5% and about 30%, and most preferably between about 10% and about 25%.

In another preferred embodiment of the invention, the article is a substantially solid article that comprises a first thermoplastic, containing between about 1% and 70% of powdered diatomaceous earth by weight, the article being formed with diatomaceous earth containing no more than about 2% by weight of moisture; more preferably the diatomaceous earth content is between about 5% and about 55% by weight of diatomaceous earth, most preferably between about 10% and about 40%.

Optionally, whether closed cell foam thermoplastic or substantially solid thermoplastic is the component, the article can be at least partially surrounded by a co-extruded protective cladding of a second thermoplastic. The first and second thermoplastic can be either the same or can be different, but preferably must be compatible with each other so that they can be co-extruded. The article surrounded and at least partially enclosed by a protective cladding will have weight, strength and rigidity characteristics comparable to the characteristics of similarly dimensioned wooden products. This article enclosed by a protective cladding will perform comparably to wood when exposed for extended periods to heat and sunshine.

Preferebly, specially where the article is not co-extruded with a protective cladding, a UV protectant such as titanium dioxide can be added to the thermoplastic before the extrusion of the article, in a preferred range of between about 1% to about 10% by weight of powdered titanium dioxide, more preferably between about 4% to about 7% by weight, and most preferably between 5% to about 6% by weight.

The article preferably contains sufficient diatomaceous earth so that the article flexural strength and flexural modulus are each greater than that of another substantially identical article without the diatomaceous earth; preferably the article contains sufficient diatomaceous earth so that its flexural strength is at least about 50% greater than that of another substantially identical article without the diatomaceous earth; preferably the article contains sufficient diatomaceous earth so that its flexural modulus is at least about 50% greater than that of another substantially identical article without the diatomaceous earth; more preferably the article contains sufficient diatomaceous earth so that the article has flexural strength and flexural modulus that are each at least about 100% greater than that of another substantially identical article without the diatomaceous earth, most preferably at least about 200% greater.

Preferably the article has an apparent density lower than 1 gm/cu. cm., more preferably less than about 0.8 gm/cu. cm., and most preferably less than about 0.65 gm/cu. cm., but no less than about 0.3 gm/cu. cm.

Preferably, the diatomaceous earth used in forming the article is sized in the range of about 50–700 standard U.S. mesh, more preferably in the range of 200–400 standard U.S. mesh, and most preferably with at least about 90% of the diatomaceous earth being finer than 300 standard U.S. mesh.

Preferably, the diatomaceous earth used in forming the article is dried by heating it to a temperature sufficiently high to cause the degradation of cellulose based materials, but substantially below the calcining temperatures of diatomaceous earth; preferably the diatomaceous earth is heated to above 230 degrees Fahrenheit, more preferably to above 300 degrees Fahrenheit, even more preferably to a temperature between about 350 degrees Fahrenheit to about 400 degrees Fahrenheit. Preferably, the diatomaceous earth contains less than about 0.5% moisture, more preferably less than about 0.20% moisture, even more preferably less than 0.10% moisture, and most preferably less than about 0.05% moisture. Preferably the first thermoplastic contains no more than about 2% by weight of moisture before the extrusion of the article.

A preferred embodiment for forming thermoplastic foam articles or products can be prepared by (a) mixing a first thermoplastic material with powdered diatomaceous earth, so that the diatomaceous earth content is between about 1% and about 40% by weight; and (b) extruding the resulting mixture to form a thermoplastic closed cell foam with at least a 50% volume expansion of the thermoplastic, to form the product. Preferably the diatomaceous earth is dried to less than about 2% moisture before mixing, more preferably performed by pre-drying the diatomaceous earth to less than about 2% moisture before mixing it with the first thermoplastic material, even more preferably to less than about 0.5% moisture, most preferably to less than about 0.1% moisture.

Preferably the first thermoplastic, when extruded to form a thermoplastic foam, is expanded at least about 50%, more preferably at least about 75%, even more preferably at least about 100%, most preferably at least about 150%, but generally not more than about 400%.

Preferably the thermoplastic foam is formed at least in part of recycled plastics; more preferably the recycled plastic is recycled from the articles or products previously prepared by the method of this invention. The article of this invention can be used to make window covering products, and can be, for example, window blind slats, and components and parts for making window shutters, such as louvers, stiles, and frames and moldings.

The powdered diatomaceous earth is typically dried at a temperature higher than that which can be used with wood. Preferably, the mixing step includes mixing the dried diatomaceous earth with the thermoplastic resin, a coupling agent, and a fatty acid to yield a first mixture. The first mixture is compressed, heated and extruded to form a pelletized and extrudable compound. Moisture is extracted from the powdered diatomaceous earth and the thermoplastic resin at one or more points during the process, to ensure that the ultimate moisture content of the pelletized compound is less than about two percent, more preferably less than about 0.2 percent, even more preferably less than about 0.1%, and most preferably less than about 0.05%.

The above process of making cell foam articles according to the invention also applies when the resulting article is a substantially solid article, and not a closed cell foam article. One exception for substantially solid articles is that the diatomaceous earth content in the substantially solid article product can be relatively higher, and range between about 1% to about 70%, preferably between 5 to 55%, more preferably between 10–40%. One of ordinary skill in the art would understand the modifications necessary to prepare a substantially solid article according to the invention.

BRIEF DESCRIPTION OF THE DRAWINGS

Other objects and advantages together with the operation of the invention may be better understood by reference to the following detailed description taken in connection with the following illustrations, wherein.

DETAILED DESCRIPTION

In order to better illustrate the advantages of the invention and its contributions to the art, a preferred hardware embodiment of the invention will now be described in some detail.

The process of this invention can be utilized with any moldable plastic material. As used herein and in the claims, the term "plastic" is intended to include any natural or synthetic polymeric material, such as thermoplastic or thermoplastic resins, which can be molded into a desired final shape using heat and/or pressure. Examples of such materials are: ABS resins, ASA resins, ionomers, nylons, polyarylene oxides, polyolefins, styrene polymers and copolymers such as styrene/butadiene, vinyl polymers and copolymers such as poly(vinyl chloride), poly(vinyl fluoride), vinylidene chloride/vinyl chloride copolymer, and the like, including blends, and recycled, impure plastics.

The terms "mold", "molded", "moldable", "molding" and the like as used herein and in the claims is intended to include any plastic forming process such as film formation by extrusion, casting, or calendering, blow molding, injection molding, extrusion, vacuum forming, pressure forming, compression molding, transfer molding, and the like.

DIATOMACEOUS EARTH

The terms diatomite and diatomaceous earth shall be used interchangeably herein. Diatomaceous earth is generally sold in particulate form, and is made from the soft, friable, earthy, very fine-grained, siliceous sedimentary rock diatomite, usually light in color (white if pure, commonly buff to gray in nature). It is very finely porous, relatively low in density, and essentially chemically inert in most liquids and gases. It has low thermal conductivity and a relatively high fusion point.

Diatomaceous earth is a common alternate name, which is sometimes used to describe the unconsolidated or less lithified sediment. These sediments and sedimentary rocks result from an accumulation in oceans or fresh waters of the amorphous silica (opal. SiO2.nH2O) cell walls of dead diatoms that are microscopic single cell aquatic organisms (algae). The fossilized skeletal remains—a pair of symmetrical shells (frustules)—vary in size from less than 1 micron to more than 1 millimeter, but are typically 10 to 200 microns across, and have a broad variety of delicate, lacy, perforated shapes from discs and balls to ladders, feathers, and needles. (Antonides, L. E., 1998, Diatomite: U.S. Geological Survey Mineral Commodity Summaries, 1998).

Overall, at many commercial operations, the analysis of oven-dried crude ore blocks typically shows 80–90% (sometimes 95%) silica (SiO2) plus alumina (2% to 4% attributed mostly to clay minerals) and hematite (0.5% to 2%), with an analytical ignition loss of 4% to 6%. In-place ores contains from 10% to as much as 65% water (2% to 10% in the opaline structure). Dry powdered natural rock can have an apparent density of 80 to 250 grams per liter, due to the high porosity of the material.

By "apparent density" it is meant the overall density of an article or material. If such article or material has voids therein and is therefore not solid, the apparent density can be lower than the actual density of just the solid portions of the article or material.

The specific gravity of diatomaceous earth is about 2; for example, it can be around 2.2 or 2.3.

Commercial diatomite products provide fine-sized, irregular shaped, porous particles having a large surface area and high liquid absorptive capacity that are very inert chemically, are mildly abrasive, have low thermal conductivity with a relatively high fusion point. Commercial diatomite product grades are affected by the size, shape, overall arrangement and proportions of the various types of frustules, and content of silica and various impurities, such as, certain minerals, and chemicals (especially the form of iron, the impurity), clay, sand, and organics. There are additional specialized application specifications, e.g., brightness, whiteness, absorptive capacity, and abrasiveness. Free crystallize silica content, although normally low, is also a specification required by some environmental regulations, particularly for calcined products.

Silicon dioxide, amorphous or crystalline, has a melting point of from about 2678 to about 3110 degrees Fahrenheit (1470–1710 degrees Celsius). Natural diatomaceous earth is calcined at approximately 1800 degrees Fahrenheit to remove impurities. For use as a filter medium, the purified product can then be sintered at a temperature of approximately 2000 degrees Fahrenheit in order to create a more uniform grain size. Neither process reaches the melting temperature of the mineral.

A major influence on the grade of diatomaceous earth is the extent of processing, i.e., naturally milled and dried, or calcined (to 1,000° C.), or flux-calcined (to 1,200° C. with the addition of up to 10% of sodium compounds such as soda ash, salt, or sodium hydroxide). Calcining is heating the diatomaceous earth in an oxidizing or reducing environment and at temperatures below the melting point of silicon dioxide—for the purpose of removing impurities. When advantageous, calcining removes organics, reduces surface area (fuses fine structure) of particles and inters them into small clusters, increases particle hardness, and oxidizes iron (changing the color of crude feed to pink); but also disadvantageously produces free silica. Flux-calcining further affects the physical and chemical properties and makes a white product. Many filter grades are calcined.

"Substantially below the calcining temperatures of diatomaceous earth" as that phrase is used in the invention and claims means temperatures that range from above 230 degrees Fahrenheit to about 400 degrees Fahrenheit.

It was discovered that incorporating a dried, porous siliceous material such as diatomaceous earth in thermoplastics significantly improves the flexural strength and related characteristics of the resulting blend. This is true for both closed cell thermoplastic foams and for solid thermoplastics.

FLEXURAL STRENGTH TESTING OF PLASTICS

The ability of a material to resist deformation under a load is its flexural strength. For materials that do not break, the load at yield, typically measured at 5% deformation/strain of the outer surface, is reported as the flexural strength or flexural yield strength. The test beam is under compressive stress at the concave surface and tensile stress at the convex surface.

Flexural Modulus is a constant used in the calculation of bending, equal to the Young's modulus of the material times the moment of inertia (the square of the radius of gyration of a cross section perpendicular to the plane of bending).

These values are a measure of stiffness.

One test used to determine flexural strength and flexural modulus is ASTM D790: a specimen of ⅛"×½"×5" is placed on two supports and a load is applied at the center. The load at yield is a material's flexural strength. The analogous test to measure flexural strength in the ISO system is ISO 178. The values reported in the ASTM D790 and ISO 178 tests in general do not vary significantly. These tests also give the procedure to measure a material's flexural modulus (the ratio of stress to strain in flexural deformation).

Plastics usually can be foamed, or substantially solid. In foamed thermoplastic plastic formation by extrusion, a blowing agent creates gasses at extruder temperatures, which in turn causes voids in the plastic to form a foam coming out of the extruder head. By "substantially solid" plastics, it is meant plastics that are not foamed. In substantially solid thermoplastic articles that are extruded, no blowing agent is used in the extrusion, and thus the resulting article is substantially solid. If porous fillers are added, there could be small voids occluded within the plastic, but the article is still substantially solid, at least in comparison to foamed plastics.

It was found that by adding a fine mesh porous siliceous material such as diatomaceous earth to a thermoplastic, the flexural strength and flexural modulus of the plastic can be significantly increased. This works for both closed cell foams, and substantially solid thermoplastics. With closed cell thermoplastic foam products, especially elongated extruded articles, the resulting improvement in flexural characteristics can allow a greater expansion ratio of the thermoplastic while maintaining acceptable stiffness, thereby enabling a light weight alternative to wood. By "elongated" it is meant that at least one of the three dimensions of the article is more than ten times longer than at least one of the other two dimensions; by "three dimensions" it is meant the three orthogonal dimensional measurements of the extruded article, at least one of which is taken along the longitudinal axis of the article. The strengthening of the thermoplastic by the diatomaceous earth compensates for the decrease in stiffness as a thermoplastic is foamed or its volume expanded.

One way to measure the stiffness of an article, or product, formed of a thermoplastic reinforced with diatomaceous earth would be to compare the flexural strength and flexural modulus of the article against that of another substantially identical article without the diatomaceous earth. The two articles can then be compared using standard testing methods for flexural strength and flexural modulus, such as those disclosed above.

"Substantially identical article without the diatomaceous earth" means an article with the same shape and dimensions, and formed under the same conditions (percent expansion if the plastic foamed, etc., among others), except that no diatomaceous earth is added to the plastic. For a foamed plastic, the percent expansion would only take into account the percent expansion of the thermoplastic, since the blowing agent causing the expansion of the plastic is not expected to cause expansion of the diatomaceous earth; i.e., a 50% volume expanded (not counting the diatomaceous earth) plastic article reinforced with diatomaceous earth would be compared to a 50% volume expanded plastic article without diatomaceous earth reinforcement, and so on. For an article with a protective co-extruded cladding, the "substantially identical article without the diatomaceous earth" would additionally have the same cladding, but again no diatomaceous earth is added to the plastic core.

It was further discovered that moisture in the extrusion mixture greatly affects extrusion performance. A drier mixture is better. Steam erupting at the extruder head can cause cavities and surface imperfections in the extruded solid thermoplastic, and can adversely affect foaming performance for foamed thermoplastics.

The moisture content of materials, especially powdery or granular materials, such as powdered diatomaceous earth, and plastic resins (either base or compounded), can conveniently be measured by "loss on drying" type moisture analyzers, such as the Mark 2 Moisture Analyzer, manufactured by the Omnimark Instrument Corporation, of Tempe, Ariz.

Since diatomaceous earth has a rather high fusion point (above 1000° C., or 1,832° F.), it can be heated to a-high temperature for rapid drying. For example, when exposed to temperatures above 220 degrees Fahrenheit for prolonged periods, wood powder or other cellulose based products can begin to break down and degrade. However, diatomaceous earth can be heated to above 300 degrees Fahrenheit, to 350° F., or even 400 degrees Fahrenheit, without deleterious effect. At these higher temperatures, wood would deteriorate relatively fast, and change color, and could lose other desirable properties. Rapid and complete removal of moisture (down to less than 0.1% is possible) from diatomaceous earth is much easier than with wood based fillers. It was discovered that, with this efficient reduction of moisture, it is possible to use very low cost single screw extruders to form extruded products from these diatomaceous earth strengthened thermoplastics, both foamed and substantially solid, and both with or without pulling a vacuum on the extruder head. This greatly reduces capital cost.

Figure 1:
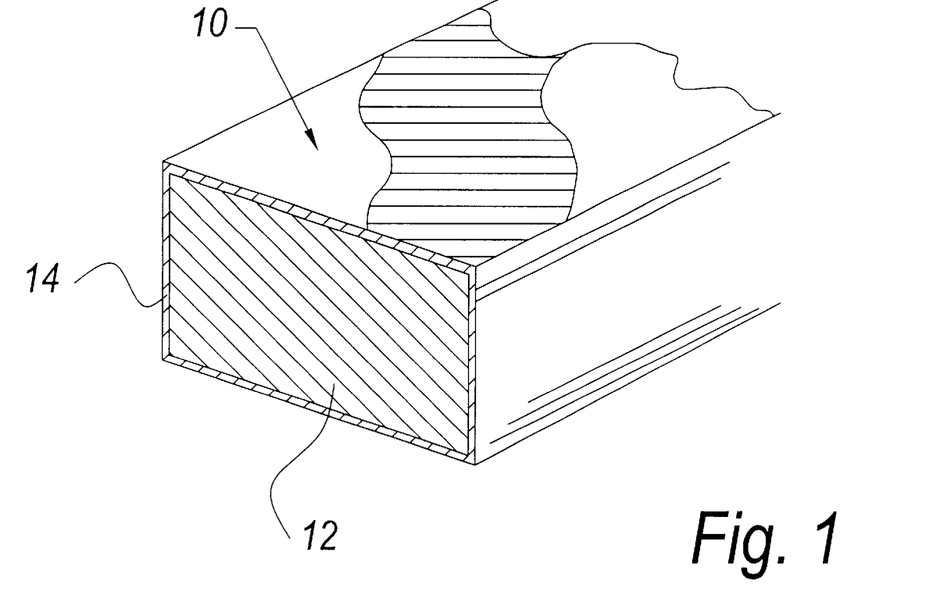
FIG. 1 represents a partially cutaway perspective view of an extruded product having a foam core surrounded and fully enclosed by a protective cladding.

FIG. 1. illustrates a window shutter frame profile 10 formed as an extruded product having a closed cell foam core 12 surrounded and fully enclosed by a thermoplastic protective cladding 14.

Figure 2:
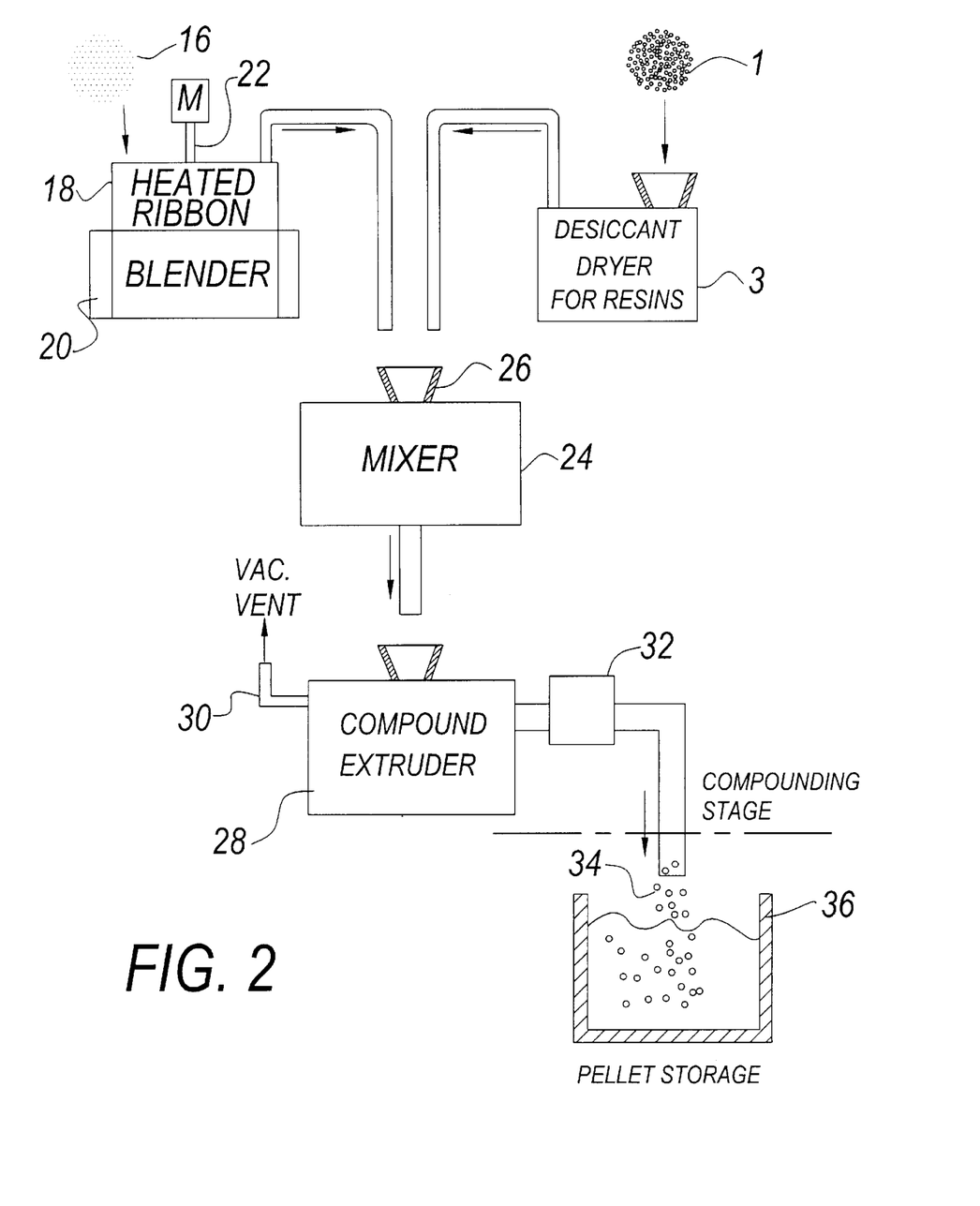
FIG. 2 schematically illustrates the structures involved in implementing the initial steps of the present invention directed to the product compounding stage.
Figure 3:
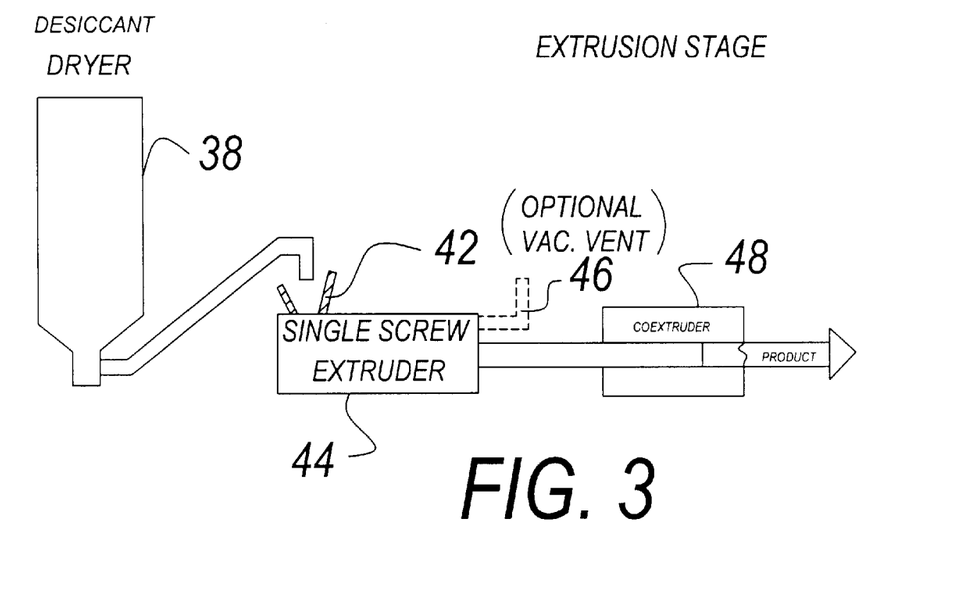
FIG. 3 schematically illustrates the structures involved in implementing the subsequent steps of the present invention directed to extruding a final product with a protective cladding.
Figure 3A:
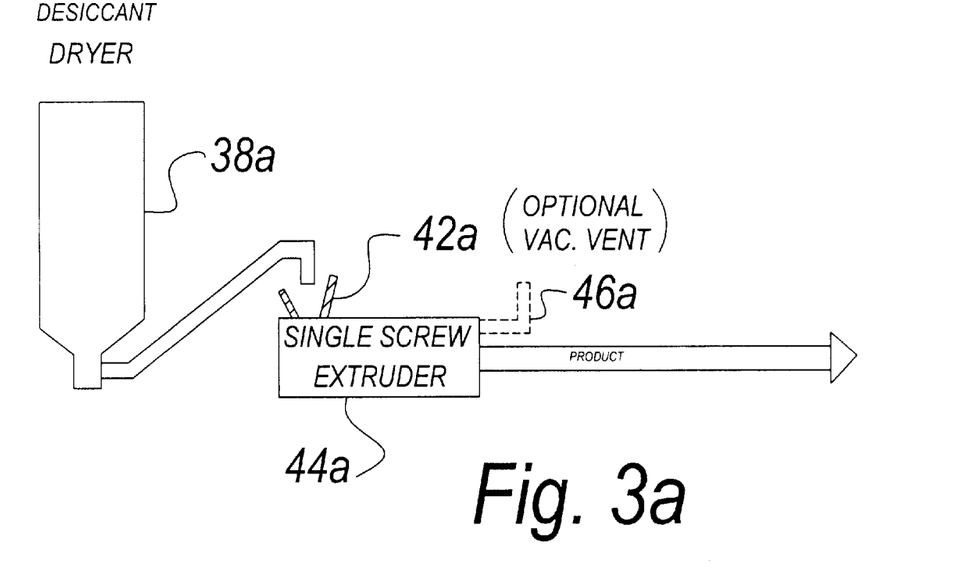
FIG. 3A schematically illustrates the structures involved in implementing the subsequent steps of the present invention directed to extruding a final product without a protective cladding.

FIGS. 2 and 3 and 3A schematically illustrate preferred structural components for implementing the process of the present invention.

In one preferred embodiment of this invention, a closed cell foam thermoplastic article is extruded. It is desirable that the resulting article has high impact and stiffness, light weight, high flexural strength, and a high flexural modulus, when compared to a substantially identical article without adding the diatomaceous earth strengthener to the thermoplastic.

The process begins with the procurement of powdered diatomaceous earth having a relatively small particle size. World Mineral, and Eagle Pitcher, both of Fernley, Nevada, supply diatomaceous earth in various forms, including powders. Although optimum results are achieved with diatomaceous earth having a fine, small particle size, larger particle sizes are fully compatible with the process, as long as the maximum particle dimension is less than the minimum dimension of the extruded product. To implement the highest performance embodiment, very fine particle sizes are preferred to maximize the uniformity of the foam core element, creating an appearance (when viewed along the cross section of foam core 12 in FIG. 1) relatively comparable to that of a wooden product. The use of small particle size powdered diatomaceous earth significantly facilitates reduction of the powdered diatomaceous earth moisture content during various stages of the process. Preferably, the particle size of the diatomaceous earth is between 20 mesh (U.S. Standard) to 500 mesh, more preferably finer than 300 mesh, for example with at least 90% passing through a 300 mesh screen (U.S. Standard); 200–400 mesh material will also work.

The moisture content of the powdered diatomaceous earth element represents one of the most critical parameters. The moisture content of the powdered diatomaceous earth is preferably reduced to as little as possible, at a level of less than about two percent, preferably less then 0.1 percent, and most preferably less than 0.05%. The foaming performance improves as the water content in the diatomaceous earth is reduced. At higher moisture contents, steam pockets are generated, and can destroy the aesthetics of the final product.

A variety of methods can be used to reduce the moisture content of the diatomaceous earth. Preferably, the powdered diatomaceous earth component can be procured with a moisture content of less than five to seven percent. The present invention works acceptably when the powdered diatomaceous earth initially contains a higher or lower moisture content. However, the process can be implemented most efficiently and most cost effectively when the moisture content of the powdered diatomaceous earth component does not exceed five to seven percent.

In FIG. 2, the powdered diatomaceous earth material 16 is first placed within a ribbon blender 18, which is surrounded by heating element 20 and which further includes motor driven mixer 22 for mixing and circulating the powdered diatomaceous earth 16 to improve the uniformity of heating and to facilitate removal of moisture.

In one implementation of the process of the present invention, the heater is set so that the temperature of the diatomaceous earth is raised to a level at which wood based materials would degrade and change color, generally above about 230 degrees Fahrenheit, preferably above about 300 degrees Fahrenheit, and more preferably above about 350 degrees Fahrenheit. The diatomaceous earth can even be heated to about 400 degrees Fahrenheit. The blender 18 is operated for a time adequate to reduce the moisture content of powdered diatomaceous earth 16 to a level of less than 2 percent, preferably less than about 0.5 percent, more preferably less than about 0.1 percent, and most preferably less than about 0.05%.

Depending on the type of thermoplastic resin used, it might also be necessary to first heat and dry the resin in the compounding stage as shown in FIG. 2. The temperature to which the thermoplastic may be heated, for the purpose of drying, would depend on the heat softening characteristics of the type of plastic. If the resin is ABS, 4 hours of drying a 2000 degrees Fahrenheit, using a desiccant dryer (using recycled hot air blown over a desiccant bed), would likely be adequate. Generally, resin pellets require pre-drying as described, and powdered plastics do not. As shown in FIG. 2, as necessary, the thermoplastic resin 1 is placed into the inlet of desiccant dryer 3. Alternatively, this predrying step may be omitted if the thermoplastic material is relatively dry (less than 1% moisture), or if it is in powdered form. If a pre-drying step is used, it is preferred that the dryer temperature be set at below the softening point of the plastic, so that the particles do not stick together or agglomerate.

As illustrated in FIG. 2, the dried powdered diatomaceous earth 16 is transferred from blender 18 to mixer 24, preferably while still hot. The thermoplastic resin 1, pre-dried as necessary, is also added. Mixer 24 does not need to be heated. Preferably, a horizontal ribbon blender is used, but other types can also suffice. In mixer 24, various other chemical components are added through input port 26 to blend the components into a relatively homogeneous mixture.

Table 1 below identifies the various components that are blended together within mixer 24, their typical component concentration ranges, the specifications for the preferred formulation and the identity of the specifically preferred components:

TABLE 1

| Concentration Ranges By Weight | Typical % By Weight | Generic Component Identifier |
|---|---|---|
| 1–40% | 15% | powdered diatomaceous earth |
| 60–99% | 85% | thermoplastic resin |
| 0.01–3% | 0.03% | coupling agent |
| 0.01–2% | 0.2% | fatty acid (lubricant) |

The approximate percentages of the above components should be adjusted, as appropriate, to equal and not exceed 100%.

The flexural strength and flexural modulus of an article made according to the present invention is comparable to an article made using ABS and wood filler. Two types of samples were made, and tested according to the protocol of ASTM D 790. The following tests show that an article strengthened with diatomaceous earth is comparable in terms of its rigidity with a wood strengthened article.

Sample 1 was made using diatomaceous earth in accordance with present invention, and the formulation of the sample was: 641 pounds of SAN ( a thermoplastic); 140 pounds of impact modifier; 200 pounds of diatomaceous earth; 15 pounds of coupling agent; 2 pounds of fatty acid; and 2 pounds of antioxidant to equal a total of 1000 pounds. Sample 2 was made using 691 pounds of SAN (a thermoplastic); 140 pounds of impact modifier; 150 pounds of wood; 15 pounds of coupling agent; 2 pounds of fatty acid; and 2 pounds of antioxidant to equal a total of 1000 pounds.

The samples were prepared as follows: a) pre-drying of about 2–3 hours at 180° F. prior to molding; b) injection molding pursuant to ASTM D 3641 method; and c) conditioning pursuant to ASTM D 618—40 hours in a standard laboratory environment. The flexural properties of samples 1 and 2 were then determined using ASTM D 790 (0.11"/minute test speed –4" point open).

The individual results of the testing for flexural strength/flexural modulus for sample 1 and sample 2 are shown below in Psi:

| Sample-1 (20% diatomaceous earth) | Sample-2 (15% Wood) |
|---|---|
| 7,920/373,300 | 9,648/341,600 |
| 7,801/308,800 | 10,131/385,500 |
| 7,874/373,900 | 9,270/386,500 |
| 8,049/331,000 | 9,447/343,100 |
| 7,709/394,400 | 10,178/334,100 |

The average flexural strength of sample 1 was 7, 871 Psi or 54 MPa. The average flexural modulus of sample 1 was 356,280 Psi or 2,456 MPa. Sample 2 had flexural strength of 9,735 Psi or 67 MPa. Sample 2 had an average flexural modulus of 358,100 Psi or 2,469 MPa.

The powdered diatomaceous earth is preferably a fine mesh (300 mesh) diatomaceous earth with less than about 5% moisture (before drying).

The thermoplastic resin is preferably ABS (acrylonitrile butadiene styrene).

The coupling agent component performs the function of increasing the compatibility of the diatomaceous earth and resin components to enhance the homogeneity of the final product. The preferred composition is a blend of fatty acid, metal soap, amide, and ethyl bis-stearamide.

The fatty acid component typically takes the form of stearic acid, although any equivalent fatty acid or animal fat, commonly referred to as tallow, could be readily substituted for stearic acid. The fatty acid component can be entirely eliminated, although when present it facilitates the blending of the diatomaceous earth with the plastic components.

The use of such coupling agents, fatty acids, and optionally additional oxidizers, in the compounding of thermoplastics for extrusion is well known in the art, and many formulations are available commercially.

The thermoplastic resin component can also be selected from polyvinyl chloride (PVC), polystyrene (PS), polypropylene (PP), acrylonitrile butadiene styrene (ABS), or acrylic-styrene-acrylonitrile (ASA). ABS is presently preferred. Other engineering thermoplastics or plastic blends are also suitable. Examples include polycarbonate, nylon, and blends of ABS-PVC, ABS-polycarbonate, and ABS-polyurethane. The base resins can be supplied in powder form or pellet form or as a blend of the two forms. The particular physical form is typically selected on the basis of lowest cost because no significant performance difference between the forms has been observed. The weight percentage concentration of the thermoplastic material is determined in response to the weight percentage concentrations of the other components so that the overall formulation yields a one hundred percent weight concentration.

Another preferred choice of thermoplastic material can be recycled plastics. In general, recycled plastic materials because of potential contaminants (such as paper, glue, or other plastics) can provide unpredictable extrusion performance, and their use is not favored when preparing many plastic articles. However, in the current application, it was found that the use of recycled plastics or blends of new and old plastics in diatomaceous earth reinforced plastics for window coverings provides satisfactory performance, and offers significant cost savings. The added stiffness and other favorable flexural characteristics provided by the diatomaceous earth, permits the use of low cost recycled plastics, to yield finished window covering products with desired performance characteristics.

More specifically, the use of recycled plastics, which are scraps and cuttings from the further processing of the finished extruded products previously manufactured as described herein, has cost benefits. The use of recycled plastics allows for greater cost recovery by reusing cuttings and scrap materials from the shop floor. For example, after the extruded products, which may be window shutter frame elements, or window shutter louvers and stiles, or window blind slats, are assembled into finished window covering products, such as shutters and blinds, the remaining cuttings and scraps, which required disposal, can now be recycled as feed for the process shown in FIG. 2, after they are properly cleaned and chopped up. The recycled scraps can also be blended with new plastics, for example in a 30(recycled)/70(new or virgin materials) blend, to yield significant cost savings.

FIG. 2 further illustrates that the blended output from mixer 24 is transferred into compounding extruder 28. The extruding zones and the dies zones within extruder 28 in a preferred embodiment are heated to a temperature of about 370 degrees Fahrenheit. The output flow rate of mixer 24 is coordinated with the operating speed of extruder 28 in a manner well known to those of ordinary skill in the art.

Optionally, vacuum port 30 as shown in FIG. 2 is typically operated with a vacuum level of about twenty-three to twenty-five inches of mercury and functions to extract additional moisture from the compressed, heated and extruded mixture. Vacuum port 30 assists in reducing the moisture content of the mixture to the two percent maximum moisture content objective. The amount of moisture actually extracted through vacuum vent 30 varies as a function of process speed. The slower the process speed, the greater the degree of control and ability available to achieve the ultimately desired product moisture content.

As shown in FIG. 2, the output from extruder 28 is fed to a conventional pelletizer 32. A Gala underwater pelletizer, from Gala Industries, Inc., of Eagle Rock, Va., has been found effective for this purpose. The pellets 34, which are compounded pellets ready for product extrusion, discharged into pellet storage bin 36 typically have a diameter of approximately one eighth inch and a length of about one quarter inch, with a preferred moisture content of less than 0.5% by weight, and more preferably less than 0.2% by weight, and most preferably less than 0.15% by weight.

The compounded pellets can be used directly in the extrusion stage shown in FIG. 3 and FIG. 3A, or they can be stored for future use. In general, it is found that after such compounding, the pellets will only pick up surface moisture, which can be rather easily removed by heating, such as by using a desiccant dryer.

Referring to FIG. 2–3, the output of pellet storage bin 36 is preferably transferred to a heated dryer 38, which can be a desiccant dryer, preferably maintained at a temperature of about 200 degree Fahrenheit. Four (4) hours a 200 degrees Fahrenheit is generally adequate for drying the compounded pellets, prior to the extrusion of the final product.

Referring to FIG. 3, the foaming agent, in metered quantities of at least about 0.05% but less than 3% of the total charge to extruder 44 is added via inlet port 42 or a similar port. The foaming agent, also commonly referred to as a blowing agent, performs the important function of allowing the heated, extruded material to expand while maintained in a heated state to fully occupy the predetermined, desired product profile. The preferred foaming agents are Foamazal 91, or XO130, or a blend of the two, both marketed by Bergen International of Rochelle Park, N.J. Foamazal 91 is endothermic and XO130 is exothermic. The foaming agent concentration, and the blend of endothermic and exothermic components can be varied as appropriate, as suggested by the manufacturer, to achieve the desired foam extrusion product profile. One example of a blend that works well with the example given above, for foamed ABS, in making a number of window blind slats is a 20/80 blend of Foamazal 91 (20%) and XO130 (80%), at a metered quantity of about 0.5% of the total charge.

In implementing the process as shown in FIG. 2–3, I found that if the moisture content of the compounded pellets 34 is kept below 0.2%, and more preferably below 0.15%, the user can employ a low cost conical single screw extruder 44 for the product extrusion step. The moisture can again be measured using "loss on drying" type moisture analyzers, such as the Mark 2 Moisture Analyzer mentioned above. Optionally, extruder 44 can also be fitted with a conventional vacuum port 46 (shown in broken lines in FIG. 3), although if the moisture of the compounded pellets are sufficiently low as described above, no vacuum should be needed. Vacuum port 46 can be operated at a vacuum level of about twenty-three to twenty-five inches of mercury, and this operation aids in maintaining the moisture content of the extruded product at the desired low level.

In a single barrel extruder for the product, there can be 3 or 4 barrel zones. In a 3 barrel zone arrangement, the temperatures in the zones (zone 1, zone 2, and zone 3) could be at about 300, 330, and 350 degrees Fahrenheit. In a 4 barrel zone arrangement, temperatures of about 290, 310, 330, and 350 degrees Fahrenheit in the zones (zone 1 through 4) would work well. These temperatures can be varied by as much as 10%, depending on the volumes extruded, and the ambient temperature.

As reported in my prior patent, U.S. Pat. No. 6,083,601, the use of thermoplastics filled with wood powders requires twin screw extruders with vacuum, which can cost several times more than a single screw extruder without vacuum, or more. The capital cost savings with the current process can thus be very significant.

Where it is desirable to have a protective cladding on the surface of the extruded article, a co-extruder 48, as shown in FIG. 3, can be used. Co-extrusion of thermoplastic articles is well known to one of ordinary skill in the art, and conventional co-extrusion methods, such as reported in my prior patent, U.S. Pat. No. 6,083,601, can be used satisfactorily. Other conventional co-extrusion methods, for both thermoplastic foams and substantially solid thermoplastics, would also be suitable.

Figure 4:
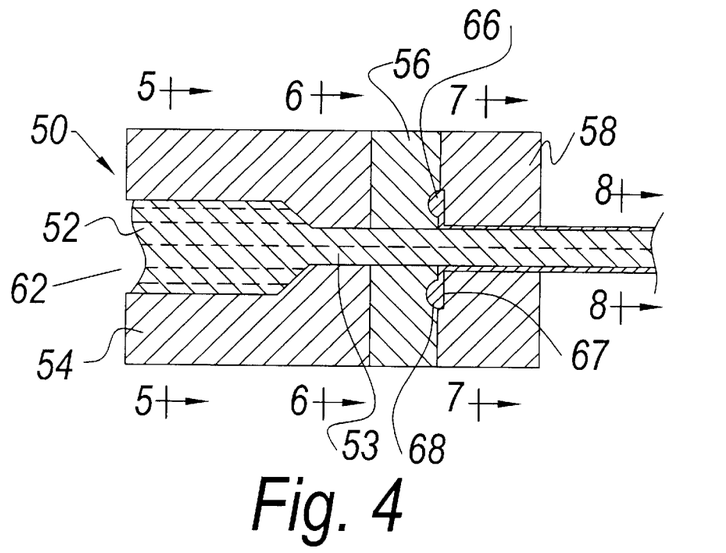
FIG. 4 represents a sectional view of the co-extrusion die for extruding the thermoplastic protective cladding around a core of the extrudable mixture.

Co-extruder 48, as shown in FIG. 3, includes both an extruder, such as a Davis standard single screw extruder, and an extruder die, such as co-extruder die 50 illustrated in FIG. 4. FIGS. 4–8 illustrate a first and preferred embodiment of the co-extrusion process where the extrudable mixture provided by extruder 44 is co-extruded with an appropriate thermoplastic cladding or coating material. The charge 52 of diatomaceous earth strengthened plastic is shaped by a first extrusion element 54 of co-extruder die 50, into the desired geometric configuration. In a second extrusion element 56 and a third extrusion element 58 of the die 50, the thermoplastic cladding layer is co-extruded around the resulting foam core.

In the preferred embodiment of the invention, the average temperature of co-extrusion die elements 54, 56, and 58 are maintained at temperatures of about 350 degrees Fahrenheit.

Figure 5:
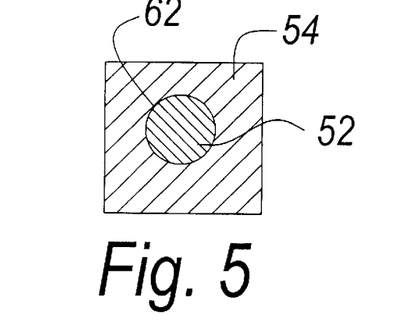
FIG. 5 represents a sectional view of the co-extrusion die illustrated in FIG. 4, taken along section lines 5—5 in FIG. 4.
Figure 6:
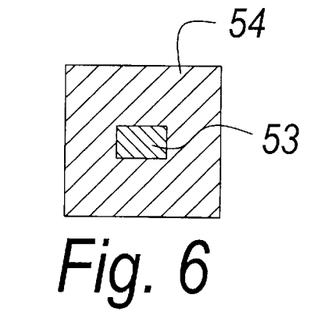
FIG. 6 represents a sectional view of the co-extrusion die illustrated in FIG. 4, taken along section lines 6—6 in FIG. 4.
Figure 7:
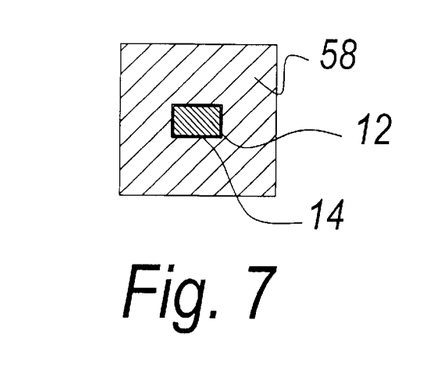
FIG. 7 represents a sectional view of the co-extrusion die illustrated in FIG. 4 taken along section lines 7—7 in FIG. 4.
Figure 8:
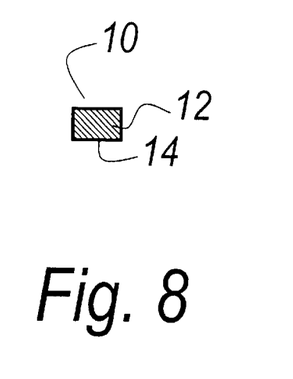
FIG. 8 represents a sectional view of the extruded product having a diatomaceous earth reinforced plastic core surrounded and fully enclosed by a protective cladding as illustrated in FIG. 4, taken along section lines 8—8 in FIG. 4.

Referring to FIGS. 4–8, co-extrusion die 50 includes a first extrusion element 54, a second extrusion element 56, and a third extrusion element 58. In first extrusion element 54, the extruded foam core material 52 received from extruder 44 passes through cylindrical passageway 62 (as illustrated in FIG. 5), and generally transitions from a cylindrical cross sectional configuration (as illustrated in FIG. 5) to the desired profile or configuration (as illustrated in FIG. 6), as extruded foam core 53. Second extrusion element 56 has a generally ring shaped channel 66, on its surface facing third extrusion element 58, the channel 66 spaced circumferentially apart from the extrusion bore of element 58. Third extrusion element 58 has a ring shaped, flat depression 67 (the depression can be as shallow as about 0.010 in to about 0.050 in) on its face adjacent second extrusion element 56; the depression reaches and is coextensive with the outside of the extrusion bore of third extrusion element 58. Channel 66 and depression 67 cooperate to form a ring-shaped cavity 68 between extrusion elements 56 and 58. This cavity 68 receives, stores and co-extrudes a thermoplastic material around the entire circumference of extruded foam core 53 (see FIG. 7). These "rings" mentioned in this example may confirm generally to the shape of the extrusion bore (in this example rectangular), and therefore need not be circular in shape.

The output from the third extrusion element 58 possesses the desired final product configuration, in the present case a rectangular shaped extruded product compatible for use as elements for window shutter frames. The continuous product fed from the output port of co-extrusion die 50 is cut to appropriate lengths in response to customer requirements. Of course other profiles and shapes can be produced, depending on consumer demand. Such products can include, for example, window covering products such as window blind slats, elements and components for building window shutters such as window shutter louvers, stiles, and frames, and other elongated articles.

The thermoplastic material co-extruded from ring shaped cavity 68 can be formulated to be ultraviolet (UV) stable, without subsequent painting, to prevent yellowing or change of color when exposed to sunlight for long periods of time. In certain applications, it is desirable to add pigments to the thermoplastic material to avoid the necessity for painting the exposed surface of the thermoplastic cladding material. Other applications, painting can be desirable, and appropriate formulation changes would be made. A wide range of thermoplastic materials are suitable for use as cladding material 14, including PVC, ABS and polycarbonate. Basically, any thermoplastic compatible with the base resin material of the extruded core can be used. Numerous other thermoplastic materials are well known to persons of ordinary skill in the art. A high grade material available from General Electric under the trademark GELOY plastic can be used as a high grade exterior plastic cladding material.

The thickness of cladding material 14 can be controlled in a variety of ways, including varying the co-extrusion pressure, as well as varying the speed of passage of the materials through co-extrusion die 50. Faster transit rates result in a thinner cladding material, while slower transit rates yield a thicker cladding material.

As a result of the action of the foaming agent, expansion of the extrudable mixture continues and is substantially complete within about three to four inches after discharge from the exit port of co-extrusion dies 50. As a function of both time and distance, the extrudable material will have expanded to the desired final product configuration by that point.

Preferably the first thermoplastic, when extruded to form a thermoplastic foam, is expanded at least about 50%, more preferably at least about 75%, even more preferably at least about 100%, most preferably at least about 150%, but generally not more than about 400%.

At the point of desired expansion, window shutter frame element 10 enters a conventional vacuum cooling and sizing or shape calibrating machine (not shown) and is drawn through a conventional calibrating profile to conform the cross sectional profile of window shutter frame element 10 to the desired end product configuration. Within the calibration equipment, a vacuum of about sixteen to eighteen inches of mercury is preferably applied while the article is cooled by a shower or water held at a temperature of approximately 68 degrees Fahrenheit.

Upon completion of the sizing and cooling operation within the calibration equipment, the continuous length of slat is cut to the appropriate customer-specified length, and used in further manufacturing steps (not the subject of this present application).

In another preferred embodiment, the cuttings and scraps from the further manufacturing steps can be cleaned, grounded up, and reused as feed to the process above, to replace, in part or in full, the thermoplastic resins.

FIG. 3A is directed to another preferred embodiment of the present invention in which there is no protective cladding on the extruded core. Structures 38a, 42a, 44a, and 46a in FIG. 3A correspond in function to 38, 42, 44, and 46 labeled in FIG. 3. As shown in FIG. 3A, the extrusion product exits extruder 44a directly, and there is no co-extruder. The steps described above, other than then co-extrusion, apply.

Figure 1A:
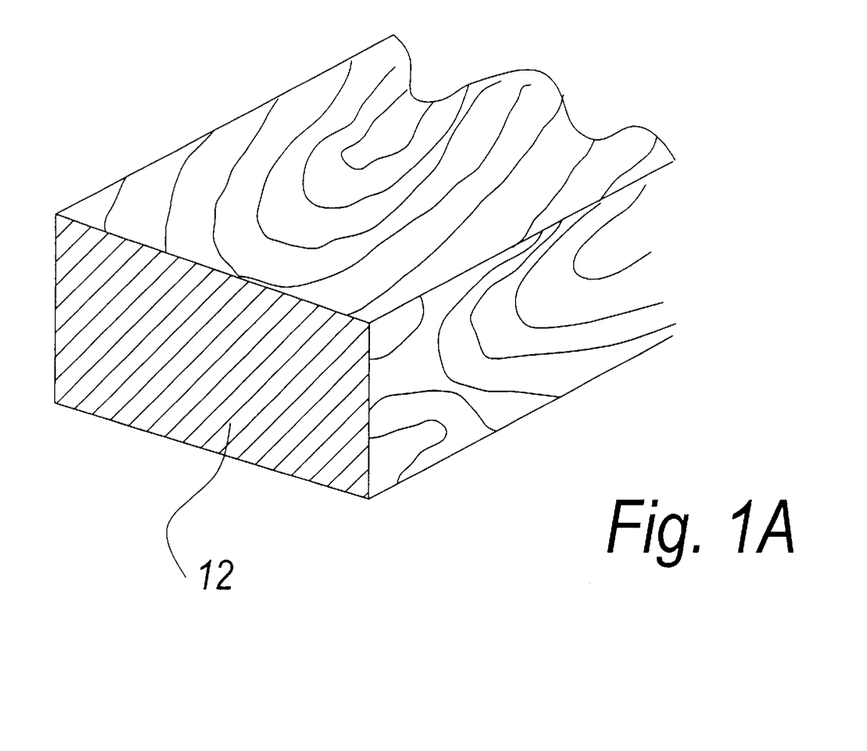
FIG. 1A represents a perspective view of an extruded product having an unclad foam core, which has been embossed with a textured finish.

Optionally, the unclad foam profile can be passed through a conventional embossing machine well known in the art (not shown) to impart a desired surface texture, e.g. a wood grain, on the article, as part of the finishing process. FIG. 1A shows such an unclad article, with a wood grain embossed on the surface. For such unclad, foamed articles, it is generally desirable to add an anti-UV property enhancer such as pigment grade, finely powdered titanium dioxide to the plastic at the compounding stage, before pellet formation, A concentration of between about 1% to about 10% would be preferred, more preferably between about 4% to about 7%, and most preferably between about 5% to about 6%. However, adding too much anti-UV property enhancer increases the cost, and the weight of the product.

The embossing and textured finishing can also be used on the article with a co-extruded protective cladding, described above.

The advantages of an article formed of a strong, stiff foam are substantial. By controlling the volume percent expansion of the thermoplastic, the apparent density of the final product or article can be made lower than that of wood. For example, window blind slats with an apparent density as low as about 0.8 gm/cu. cm., 0.65 gm/cu. cm., or even lower, can be produced by the invention.

Although, the above description is directed to a closed cell foam, the same process can be used with solid plastics. The main difference is that no foaming or blowing agent is used at the product extruder. The resulting product or article, which is not foamed, is therefore substantially solid. Further, for solid plastic extrusion, the diatomaceous earth content in the extruded product can be relatively higher, and can be in the range between about 1% to about 70%, preferably between 5 to 55%, more preferably between 10–40%. It was found that, with diatomaceous earth of very low moisture content used as a strengthener, the thermoplastic remains extrudable, and the stiffness and flexural characteristics of the solid, unfoamed thermoplastic are also greatly enhanced. With these modifications (e.g. in the ranges of the weight percent of diatomaceous earth, and by replacing the description so that the extruded core is no foamed, but rather formed of a substantially solid thermoplastic, the above description directed to a closed cell foam shall also apply, and shall not be repeated here.

Figure 9:
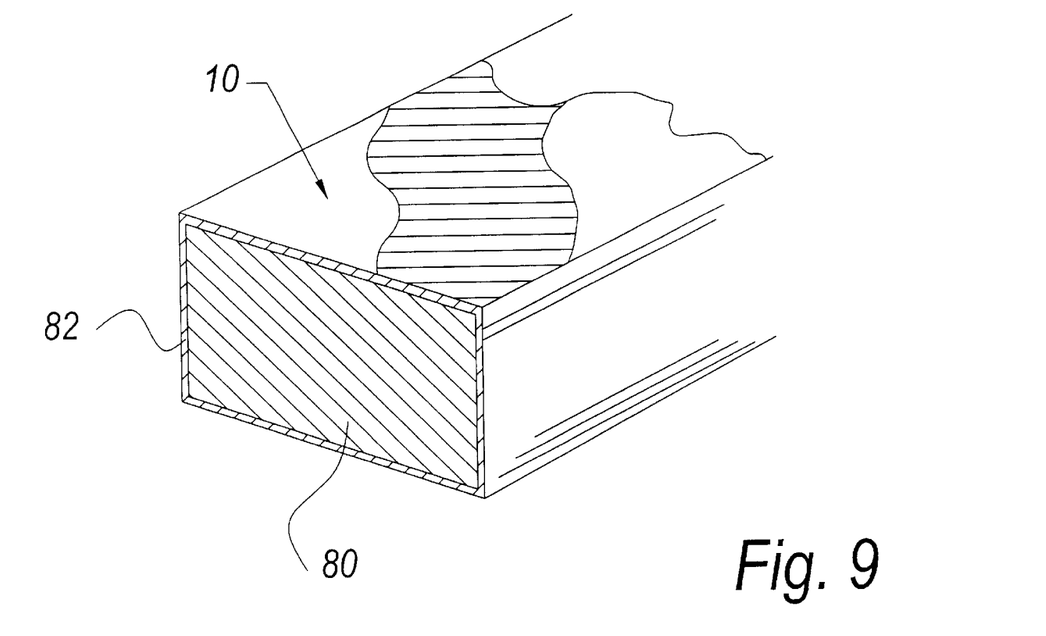
FIG. 9 represents a partially cutaway perspective view of an extruded product having a substantially solid plastic core surrounded and fully enclosed by a protective cladding.
Figure 10:
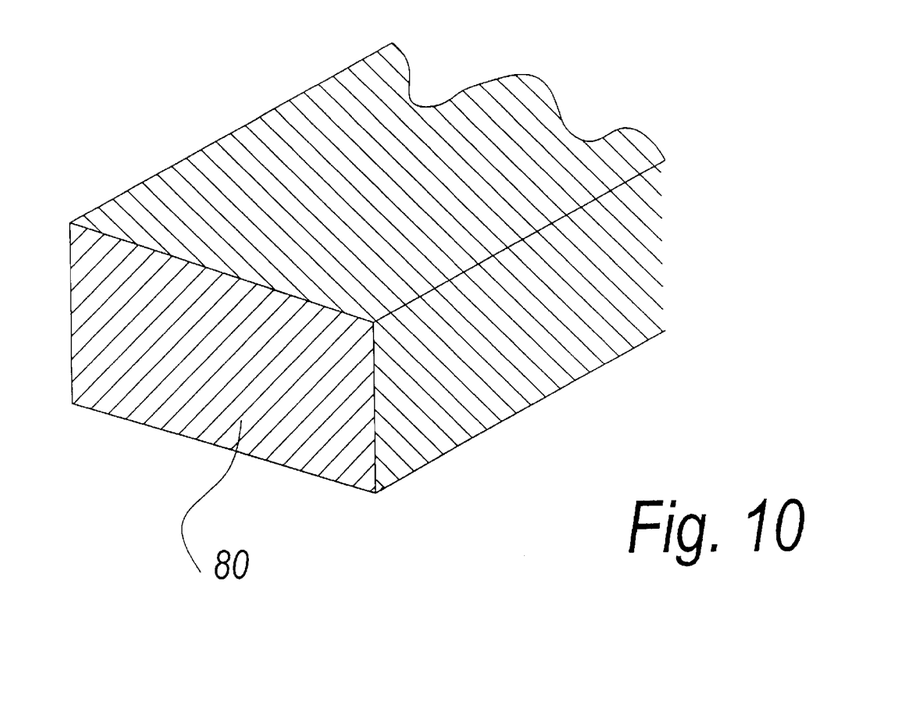
FIG. 10 represents a partially cutaway perspective view of an extruded product of a substantially solid plastic, without a protective cladding.

The substantially solid thermoplastic extruded product can also be made in both clad and unclad forms. FIG. 9 shows window shutter element 10, formed of an extruded, substantially solid thermoplastic core containing finely powdered diatomaceous earth, and substantially entirely clad in a co-extruded protective thermoplastic cladding, as was generally described above for the extruded thermoplastic foam article. FIG. 10 shows window shutter element 10, unclad and not embossed with added surface texture.

FIGS. 2, 3 and 3A illustrate a structural embodiment that can implement the process or method of the present invention. Although a ribbon blender 18 has been illustrated as one device suitable for-controllably reducing the moisture content of powdered diatomaceous earth 16, a paddle blender or a tumble dryer can be substituted for blender 18 to accomplish the same objective. In another embodiment, blender 18 can be entirely eliminated, with the dried feeds of diatomaceous earth and the base resin going directly to the compound extruder.

While a single screw extruder 44 is shown as an example in FIG. 3, twin screw extruders, such as the conical twin screw extruders from Cincinnati Milacron, can also be used.

As another example of a method that can be used for the invention, while compounding is commonly used in extrusion, it is also possible, though not preferred, to skip the compounding step, and add the mixed ingredients (outlet from mixer 24) directly to the inlet port 42 of extruder 44.

While the description above is worded largely as related to extruded plastics, the process of this invention can be utilized with any moldable plastic material, and this invention should also be read as if the term "extruded" is replaced by the broader term "molded." The terms "mold", "molded", "moldable", "molding" and the like as used herein and in the claims is intended to include any plastic forming process such as film formation by extrusion, casting, or calendering, blow molding, injection molding, extrusion, vacuum forming, pressure forming, compression molding, transfer molding, and the like.

As used herein and in the claims, the term "plastic" is intended to include any natural or synthetic polymeric material, such as thermoplastic or thermoplastic resins, which can be molded into a desired final shape using heat and/or pressure. Examples of such materials are: ABS resins, ASA resins, ionomers, nylons, polyarylene oxides, polyolefins, styrene polymers and copolymers such as styrene/butadiene, vinyl polymers and copolymers such as poly(vinyl chloride), poly(vinyl fluoride), vinylidene chloride/vinyl chloride copolymer, and the like, including blends, and recycled, impure plastics.

While the description above describe mostly window covering products, the process of this invention can be used to mold or form any other moldable products, and thus the invention is intended to cover these products. Further, the process of this invention can be used in most applications in which wood or wood products may advantageously be used, including but not limited to window covering products, window frames, picture frames, decorative molding, floor boards, flooring, decking, sheets, and studs.

Having thus described the invention, it should be apparent that numerous modifications and adaptations may be resorted to without departing from the scope and fair meaning of the instant invention as set forth hereinabove and as described herein below by the claims.

Although the present invention has been described in considerable detail with reference to certain preferred versions thereof, other versions are possible. Therefore, the spirit and scope of the appended claims should not be limited to the description of the preferred versions described herein.

All features disclosed in the specification, including the claims, abstracts, and drawings, and all the steps in any method or process disclosed, may be combined in any combination, except combinations where at least some of such features and/or steps are mutually exclusive. Each feature disclosed in the specification, including the claims, abstract, and drawings, can be replaced by alternative features serving the same, equivalent or similar purpose, unless expressly stated otherwise. Thus, unless expressly stated otherwise, each feature disclosed is one example only of a generic series of equivalent or similar features.

Any element in a claim that does not explicitly state "means" for performing a specified function or "step" for performing a specified function, should not be interpreted as a "means" or "step" clause as specified in 35 U.S.C. § 112.

What is claimed is:

1. An extruded article comprising a closed cell foam of a first thermoplastic, containing between about 1% and 40% of powdered diatomaceous earth by weight, the extruded article being formed with diatomaceous earth containing no more than about 2% by weight of moisture.

2. The extruded article of claim 1, wherein the article is at least partially surrounded by a co-extruded protective cladding of a second thermoplastic.

3. The extruded article of claim 1, containing sufficient diatomaceous earth so that the article has a flexural strength that is at least about 50% greater than that of a substantially identical article without the diatomaceous earth.

4. The extruded article of claim 1, containing sufficient diatomaceous earth so that the article has a flexural modulus that is at least about 50% greater than that of the substantially identical article without the diatomaceous earth.

5. The extruded article of claim 1, containing sufficient diatomaceous earth so that the extruded article has flexural strength and flexural modulus that are each at least about 100% greater than that of the substantially identical article without the diatomaceous earth.

6. The extruded article of claim 3 having an apparent density of less than about 1 gm/cu. cm.

7. The extruded article of claim 6 having an apparent density of less than about 0.65 gm/cu. cm. but no less than about 0.3 gm/cu. cm.

8. The extruded article of claim 1, wherein the article was formed with the first thermoplastic extruded as thermoplastic foam that expanded at least about 50%, but no greater than about 400%.

9. The extruded article of claim 8, wherein the article was formed with the first thermoplastic extruded as thermoplastic foam that expanded at least about 150%.

10. The extruded article of claim 3, wherein the article was formed with diatomaceous earth sized in the range of about 50–700 standard U.S. mesh.

11. The extruded article of claim 10, wherein the article was formed with at least about 90% of the diatomaceous earth finer than 300 standard U.S. mesh.

12. The extruded article of claim 11, wherein the article contains between about 10% and about 25% of powdered diatomaceous earth by weight.

13. The extruded article of claim 1, wherein the article was formed with diatomaceous earth dried by heating it to a temperature sufficiently high to cause the degradation of cellulose based materials, but substantially below the calcining temperatures of diatomaceous earth.

14. The extruded article of claim 1, wherein the extruded article was formed with diatomaceous earth containing less than about 0.5% moisture.

15. The extruded article of claim 14, wherein the extruded article was formed with diatomaceous earth containing less than about 0.05% moisture.

16. The extruded article of claim 1, wherein the extruded article was formed with the first thermoplastic further comprising between about 1% to about 10% by weight of powdered titanium dioxide.

17. A method for preparing a thermoplastic product comprising the steps of:
   (a) mixing a first thermoplastic material with powdered diatomaceous earth, so that the diatomaceous earth content is between about 1% and about 40% by weight; and said diatomaceous earth containing no more than about 2% by weight of moisture
   (b) extruding the resulting mixture to form a thermoplastic closed cell foam with at least a 50% volume expansion of the thermoplastic, to form the product.

18. The method of claim 17 further comprising the step of drying the diatomaceous earth to less than about 2% by weight of moisture.

19. The method of claim 17 further comprising the step of pre-drying the diatomaceous earth to less than about 2% by weight of moisture before mixing it with the first thermoplastic material.

20. The method of claim 17 wherein the diatomaceous earth used has less than about 0.5% by weight of moisture.

21. The method of claim 20 wherein the diatomaceous earth has less than about 0.1% by weight of moisture.

22. The method of claim 17, wherein the diatomaceous earth was dried by heating it to a temperature sufficiently high to cause the degradation of cellulose based materials, but substantially below the calcining temperatures of diatomaceous earth.

23. The method of claim 22, wherein the diatomaceous earth was heated to above 230 degrees Fahrenheit.

24. The method of claim 17, further comprising the step of drying the first thermoplastic material to less than about 2% moisture.

25. The method of claim 17 wherein the diatomaceous earth content in the mixture is between about 5% to about 30% by weight.

26. The method of claim 17 wherein at least about 90% of the diatomaceous earth is finer than 300 standard U.S. mesh.

27. The method of claim 17, further comprising the step of adding powdered titanium dioxide to the mixture during the mixing step, so that the titanium dioxide content is between about 4% to about 7% by weight.

28. The method of claim 17, further comprising the step of at least covering partially the surface of the article with a co-extruded protective cladding of a second thermoplastic material.

29. An extruded substantially solid article comprising a first thermoplastic, containing between about 1% and 7% of powdered diatomaceous earth by weight, the article being formed with diatomaceous earth containing no more than about 2% by weight of moisture.

30. The article of claim 20, further comprising a co-extruded protective cladding of a second thermoplastic at least partially surrounding the first thermoplastic.

31. The article of claim 29, wherein the article was formed using sufficient diatomaceous earth so that the article has a flexural strength at least about 50% greater than a substantially identical article without the diatomaceous earth.

32. The article of claim 29, wherein the article was formed using sufficient diatomaceous earth so that the article has a flexural modulus at least about 50% greater than a substantially identical article without the diatomaceous earth.

33. The article of claim 29, wherein the article is a slat for window blinds.

34. The article of claim 29, weherein the article is a window shutter louver.

35. The article of claim 29, wherein the article is a window shutter stile.

36. The article of claim 29, wherein the article is part of a window shutter frame.

37. The article of claim 29, wherein the article was formed with diatomaceous earth dried by heating it to a temperature sufficiently high to cause the degradation of cellulose based materials, but substantially below the calcining temperatures of diatomaceous earth.

38. The article of claim 29, wherein the first thermoplastic used in forming the article contained no more than about 2% by weight of moisture before the article is extruded.

39. A method for preparing a thermoplastic product comprising the steps of:
   (a) mixing a first thermoplastic material with a powdered diatomaceous earth so that the diatomaceous earth content is between about 1% and about 70% by weight, and wherein the diatomaceous earth has less than 2% by weight of moisture; and
   (b) extruding the resulting mixture to form a substantially solid product.

40. The method of claim 39 further comprising the step of pre-drying the diatomaceous earth to less than about 2% by weight of moisture before mixing it with the first thermoplastic material.

41. The method of claim 40 wherein the diatomaceous earth used has less than about 0.5% by weight of moisture.

42. The method of claim 41 wherein the diatomaceous earth has less than about 0.1% by weight of moisture.

43. The method of claim 39, wherein the diatomaceous earth was dried by heating it to a temperature sufficiently high to cause the degradation of cellulose based materials, but substantially below the calcining temperatures of diatomaceous earth.

44. The method of claim 43, wherein the diatomaceous earth was heated to above 230 degrees Fahrenheit.

45. The method of claim 44, wherein the diatomaceous earth was dried by heating to about 400 degrees Fahrenheit.

46. The method of claim 39, wherein the powdered diatomaceous earth by weight in the mixture is between about 5% and about 55% by weight.

47. The method of claim 39, wherein the diatomaceous earth is sized in the range of about 200–400 standard U.S. mesh.

48. The method of claim 47, wherein at least about 90% of the diatomaceous earth is finer than 300 standard U.S. mesh.

49. The method of claim 39, further comprising the step of at least covering partially the surface of the article with a co-extruded protective cladding of a second thermoplastic material.

* * * * *

UNITED STATES PATENT AND TRADEMARK OFFICE
CERTIFICATE OF CORRECTION

PATENT NO. : 6,583,189 B1
DATED : July 9, 2003
INVENTOR(S) : King, Gordon

It is certified that error appears in the above-identified patent and that said Letters Patent is hereby corrected as shown below:

Column 1,
Line 9, replace "Ser. No. 10/189,217" with -- Ser. No. 10/199,217 --.

Column 2,
Line 20, replace "specially" with -- especially --.

Column 9,
Line 1, replace "a 2000 degrees" with -- at 200 degrees --.

Column 11,
Line 58, replace "a 200 degrees" with -- at 200 degrees --.

Column 17,
Line 61, replace "7%" with -- 70% --.

Column 18,
Line 12, replace "weherin" with -- wherein --.

Signed and Sealed this

Sixteenth Day of September, 2003

JAMES E. ROGAN
*Director of the United States Patent and Trademark Office*